US008606868B2

(12) United States Patent
Bodin et al.

(10) Patent No.: US 8,606,868 B2
(45) Date of Patent: Dec. 10, 2013

(54) COMMUNITY BASED MEASUREMENT OF CAPABILITIES AND AVAILABILITY

(75) Inventors: William K Bodin, Austin, TX (US); David Jaramillo, Lake Worth, FL (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/157,365

(22) Filed: Jun. 10, 2011

(65) Prior Publication Data
US 2012/0317206 A1    Dec. 13, 2012

(51) Int. Cl.
*G06F 15/16*    (2006.01)

(52) U.S. Cl.
USPC .......................................... 709/206; 709/205

(58) Field of Classification Search
USPC ....................................................... 709/206
See application file for complete search history.

(56) References Cited

U.S. PATENT DOCUMENTS

| 7,325,249 | B2 | 1/2008 | Sutton, Jr. et al. | |
| 2006/0116960 | A1* | 6/2006 | Gillin et al. | 705/40 |
| 2007/0208803 | A1* | 9/2007 | Levi et al. | 709/203 |

OTHER PUBLICATIONS

Ginevan, S. "Rollouts, A Blackberry in your Palm," Network npu for IT by IT, Oct. 12, 2006, NWC, vol. 17, No. 21, pp. 28-30.

IBM, Raleigh Center, "Information/Management V6.3 Installation as an Enterprise-Wide Server: Web Connector, E-Mail and Remote API Support," Jan. 1997, pp.

Research in Motion Limited, "Technical White Paper Blackberry Enterprise Server," for Lotus Domino, Version 2.0 with Service Pack 1a, 1997-2001, 19 pages.

Microsoft Exchange Server 2007, "Microsoft Exchange Server 2007 Product Guide," Jan. 2007, 16 pages.

\* cited by examiner

*Primary Examiner* — Tauqir Hussain
(74) *Attorney, Agent, or Firm* — Gibb & Riley, LLC

(57) ABSTRACT

Systems and methods herein monitor the ability of an electronic mail (e-mail) computer server to send and receive e-mail messages to and from e-mail clients of the e-mail computer server. The e-mail computer server provides, to the e-mail clients, updates regarding the ability to send and receive e-mail messages. When the e-mail clients determine that the e-mail computer server is unable to send the e-mail messages, the e-mail clients activate a special software program of instructions. When the program of instructions is active and the e-mail clients then receive an e-mail message from the e-mail computer server, the program of instructions causes those e-mail clients who have received an e-mail message to provide an indication of e-mail receipt to the e-mail computer server. When the e-mail computer server receives this indication of e-mail receipt from the e-mail clients, the e-mail computer server can provide an update to the other e-mail clients that e-mail can now be sent.

16 Claims, 8 Drawing Sheets

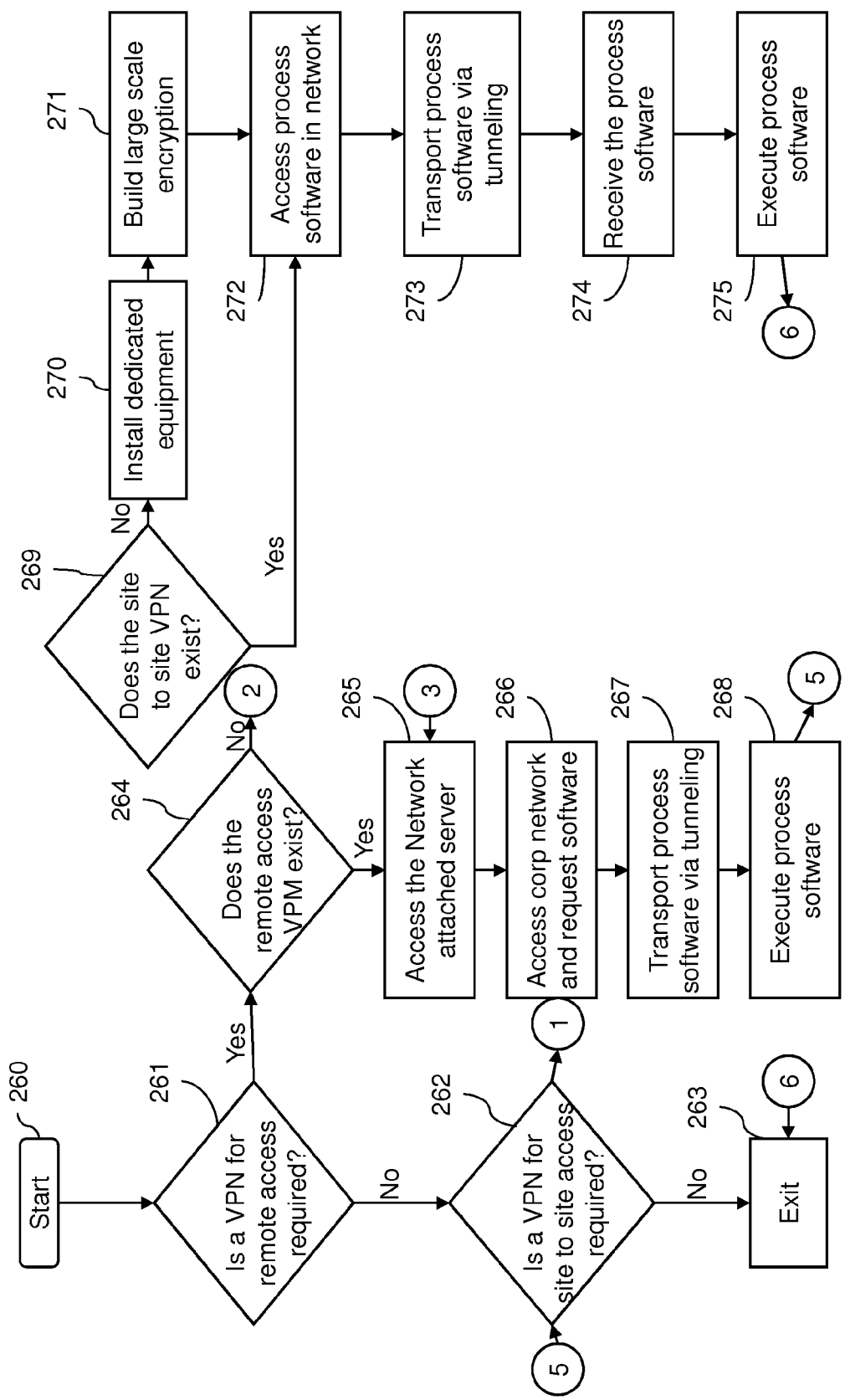

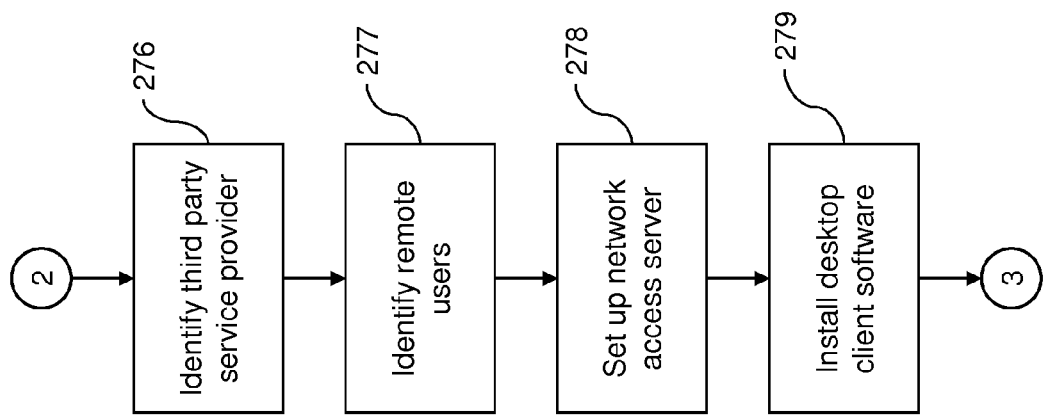

COMMUNITY BASED MEASUREMENT OF CAPABILITIES AND AVAILABILITY

BACKGROUND

The embodiments herein relate to monitoring the ability of a server to send and receive e-mails, and more specifically to structures and methods that, when e-mail clients receive an e-mail message after an e-mail outage, cause those e-mail clients who have received an e-mail message to provide an indication of e-mail receipt to the e-mail computer server, which in turn allows the e-mail computer server to provide an update to the other e-mail clients that e-mail can now be sent.

Mobile device e-mail usage is increasing at astounding rates. With this adoption, users are often faced with calling service providers and help desks in order to determine problems relating to their e-mail service or device. Enterprises will continue to experience problems with their corporate networks and applications, such as e-mail server outages, as general mobile adoption increases. These enterprises, focused on keeping costs down, will need solutions that automate problem self-determination and resolution. This disclosure addresses a facet of self-determination of services.

SUMMARY

One exemplary computer-implemented method herein monitors the ability of an electronic mail (e-mail) computer server to send and receive e-mail messages to and from e-mail clients of the e-mail computer server. The e-mail computer server provides, to the e-mail clients, updates regarding the ability to send and receive e-mail messages. When the e-mail clients determine that the e-mail computer server is unable to send the e-mail messages, the e-mail clients activate a special software program of instructions using a flag or other indicator. When the program of instructions is active and the e-mail clients then receive an e-mail message from the e-mail computer server, the program of instructions causes those e-mail clients who have received an e-mail message to provide an indication of e-mail receipt to the e-mail computer server. Then, when the e-mail computer server receives this indication of e-mail receipt from the e-mail clients, the e-mail computer server can provide an update to the other e-mail clients that e-mail can now be sent. When the e-mail clients receive the update that e-mail can be sent, the e-mail clients deactivate the program of instructions by removing the flag.

Another computer-implemented method herein uses at least one first computerized device to monitor the ability of an electronic mail (e-mail) computer server to send and receive e-mail messages to and from second computerized devices operated by e-mail clients of the e-mail computer server. This method provides, to the second computerized devices of the e-mail clients, updates regarding the ability to send and receive e-mail messages using the first computerized devices. When the second computerized devices determine that the e-mail computer server is unable to send the e-mail messages, the second computerized devices activate a program of instructions. When the program of instructions is active and at least one of the second computerized devices then receives an e-mail message from the e-mail computer server, the program of instructions causes the second computerized devices to provide an indication of e-mail receipt to the e-mail computer server. Then, when the e-mail computer server receives the indication of e-mail receipt from the second computerized devices, the first computerized devices provide an update to the second computerized devices that e-mail can be sent. Also, when the second computerized devices receive the update that e-mail can be sent, the second computerized devices deactivate the program of instructions.

An exemplary e-mail computer server embodiment herein comprises at least one processor and at least one communications port operatively connected to the processor. The communications port sends and receives e-mail messages to and from e-mail clients of the e-mail computer server. The processor monitors the ability to send and receive the e-mail messages to and from e-mail clients of the e-mail computer server. The communications port provides, to the e-mail clients, updates regarding the ability to send and receive e-mail messages. The communications port also provides, to the e-mail clients, a program of instructions. When the e-mail clients determine that the e-mail computer server is unable to send the e-mail messages, the e-mail clients activate the program of instructions. When the program of instructions is active and then the e-mail clients receive an e-mail message from the e-mail computer server, the program of instructions causes the e-mail clients to provide an indication of e-mail receipt to the e-mail computer server. Then when the e-mail computer server receives the indication of e-mail receipt from the e-mail clients, the e-mail computer server provides an update to the e-mail clients that e-mail can be sent. After the e-mail clients receive the update that e-mail can be sent, the e-mail clients then deactivate the program of instructions.

A computer storage device embodiment herein comprises a non-transitory computer-readable storage medium storing a program of instructions executable by a computer, the program of instructions causes the computer to perform a method that monitors the ability of an electronic mail (e-mail) computer server to send and receive e-mail messages to and from e-mail clients of the e-mail computer server. The e-mail computer server provides, to the e-mail clients, updates regarding the ability to send and receive e-mail messages. When the e-mail clients determine that the e-mail computer server is unable to send the e-mail messages, the e-mail clients activate a special software program of instructions. When the program of instructions is active and the e-mail clients then receive an e-mail message from the e-mail computer server, the program of instructions causes those e-mail clients who have received an e-mail message to provide an indication of e-mail receipt to the e-mail computer server. Then, when the e-mail computer server receives this indication of e-mail receipt from the e-mail clients, the e-mail computer server can provide an update to the other e-mail clients that e-mail can now be sent. When the e-mail clients receive the update that e-mail can be sent, the e-mail clients deactivate the program of instructions.

BRIEF DESCRIPTION OF THE SEVERAL VIEWS OF THE DRAWINGS

The embodiments herein will be better understood from the following detailed description with reference to the drawings, which are not necessarily drawing to scale and in which:

FIG. 7 is a schematic diagram of a virtual private network system according to embodiments herein; and FIG. 8 is a schematic diagram of a virtual private network system according to embodiments herein.

DETAILED DESCRIPTION

As mentioned above, it is becoming more important to automate notifications to users regarding the availability of e-mail servers to send and receive e-mails in order to avoid customer service centers from being overwhelmed during times of e-mail outage. This disclosure provides methods and infrastructure that determines the current state of e-mail delivery readiness. An application layer can convey the current state of e-mail delivery readiness to the user using text notifications, or a simple graphical indicator.

This disclosure further addresses the problem of determining precisely when e-mail send capability has returned online after having been offline (or in an outage). This disclosure provides a method that monitors the delivery of an e-mail in a mobile enterprise server. It does this by hooking an inbound e-mail (application programming interface) API on the client. After an outage has occurred, the first mobile client to receive an e-mail on a particular mobile enterprise server correspondingly sends an "e-mail up" message to the mobile enterprise server (MES). Therefore, the embodiments herein provide a community based measurement of capabilities and availability of the e-mail server, because the availability determination is made by the user's themselves, instead of the standard monitoring systems. This results in the MES generating push transactions to the clients on that MES, which communicates that service for e-mail has been restored.

Thus, the methods and infrastructure described herein determine the current state of e-mail delivery readiness and the application layer can convey this to the user by using notifications, a graphical indicator, etc. This addresses the problem of determining precisely when the e-mail send capability has returned online after having been offline (or in an outage). Therefore, a client application monitors if the users e-mail server is up, and if the client application receives an e-mail and it has been previously told the e-mail server is down, the client application will alert the service that its e-mail server is now up.

Figure 1:
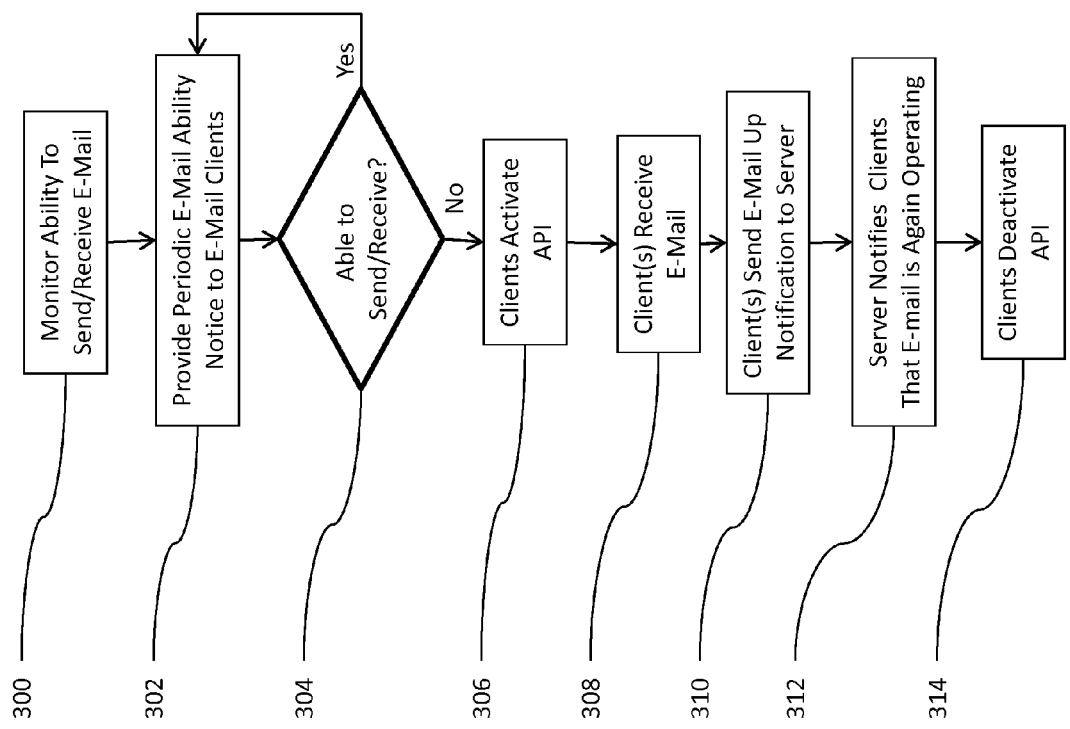
FIG. 1 is a flow diagram of illustrating various exemplary embodiments herein.
Figure 2:
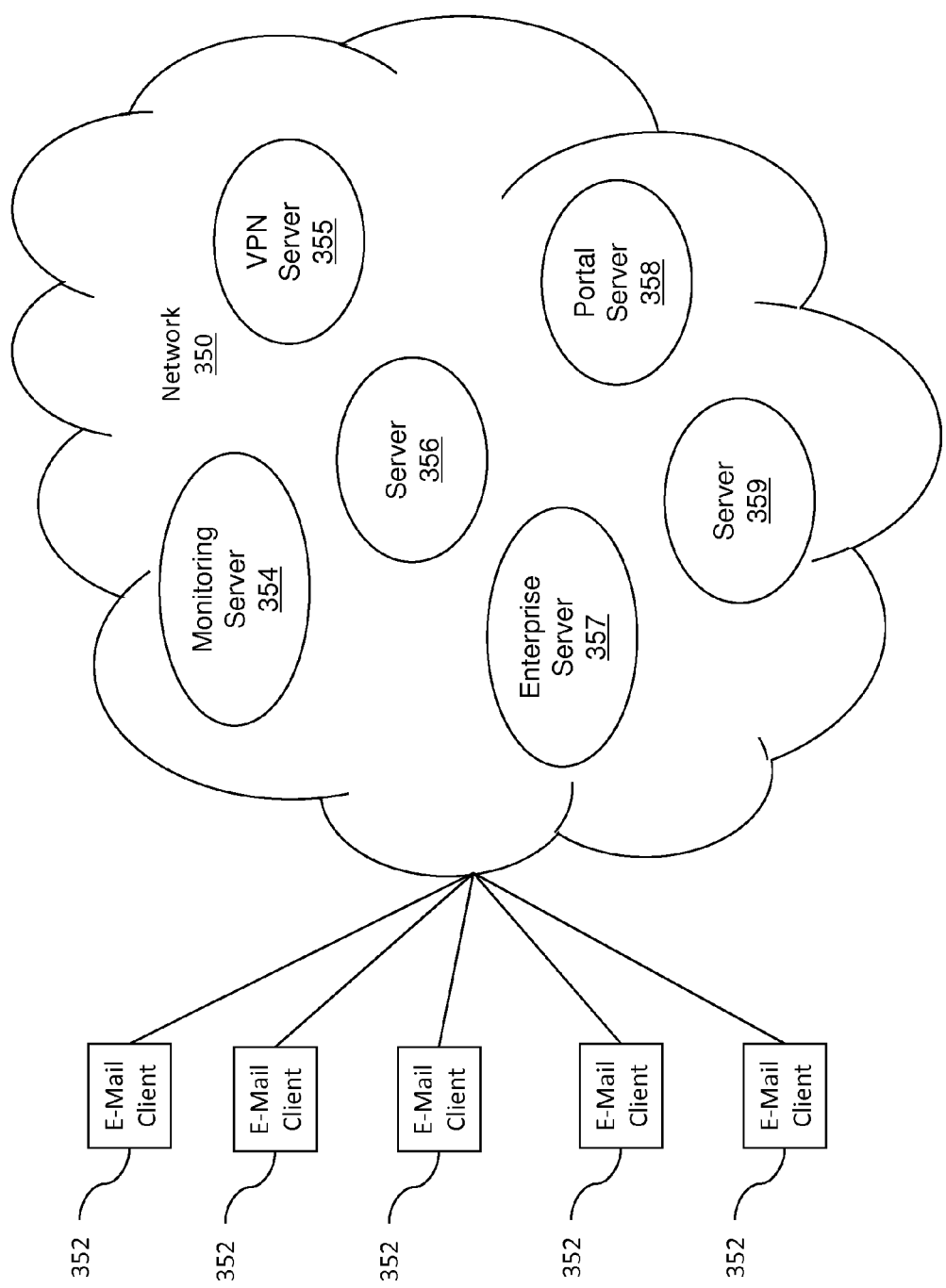
FIG. 2 is a schematic diagram illustrating an exemplary hardware environment that can be used to implement the embodiments of the invention.

As shown generally in flowchart form in FIG. 1, in one example, the methods herein monitor the ability of an electronic mail (e-mail) computer server to send and receive e-mail messages to and from e-mail clients of the e-mail computer server (item 300). The e-mail clients 352 can be mobile or non-mobile devices, such as desktop computers, laptop computers, cell phones, smart phones, personal digital assistants (PDA's), etc. As shown in FIG. 2, many different computerized devices can assist, monitor, etc., and work with the e-mail server, and at some points are simply referred to herein as the "e-mail server system" even though they may include many different and diverse devices.

The monitoring process in item 300 is performed internally by various systems that monitor the performance of the e-mail computer server, without contacting or asking for responses from the e-mail clients. Many computers/systems that monitor e-mail servers and associated computers and networks are currently available and more are being developed. For example, some such systems include the Tivoli Enterprise monitoring system; Lotus Domino Agent; IBM BlackBerry Enterprise Servers (all available from IBM Corporation, Armonk, N.Y., USA), etc.

The e-mail computer server system provides, to the e-mail clients, periodic updates regarding the ability to send and receive e-mail messages in item 302. For example, the e-mail computer server system can provide its status on a predetermined schedule, on demand, etc., and the ability to send and receive e-mail messages can be represented on the e-mail client computers 352 as a graphic icon, a textual notification, etc.

In item 304, the e-mail clients determine whether the e-mail computer server is able to send/receive the e-mail messages. Item 304 can be performed in a number of different ways. For example, if the e-mail computer server system is designed to broadcast a periodic status notification according to a predetermined schedule, and the e-mail client does not receive the regularly scheduled broadcast, the e-mail client can determine that a problem has occurred and that the e-mail computer server system is not sending or receiving e-mail messages. Similarly, each e-mail client may periodically send test messages that, if not responded to, indicate that the server cannot perform the send/receive function. Alternatively, the e-mail server system may be able to (directly or indirectly) transmit an indication of a detected problem to the e-mail clients to allow the e-mail clients to be aware of the e-mail disruption/outage. As another example, after a number of failed send/receive attempts, an e-mail client may make the determination that there is a problem with the e-mail computer server system. Those ordinarily skilled in the art would understand that many other ways are available to determine if the e-mail computer server system is suffering from at least one problem, and the embodiments herein are considered to include all such ways.

The problem that may be occurring with the e-mail computer server system may not affect the entire e-mail system, but may only affect certain e-mail clients, only affect sending e-mails, only affect receiving e-mails, only affect specific types of e-mails, etc. Therefore, each e-mail client may reach a different determination in item 304.

If at least one e-mail client determines that the e-mail computer server is unable to send/receive the e-mail messages in item 304, processing proceeds to item 306, where the e-mail clients activate a special software program of instructions (which can be in the form of activating or deactivating a flag or other indicator of an API). This API runs on the computerized devices of the e-mail clients (and not on the computerized devices associated with the e-mail computer server system) to provide the community based measurement of capabilities and availability of the e-mail server. In other words, because the API runs on the e-mail clients, it can still continue to operate even when the e-mail computer server system fails to operate.

When the program of instructions flag is active (after item 306, indicating that the e-mail computer server is unable to send/receive the e-mail messages) but then at least one of the e-mail clients receive an e-mail message from the e-mail computer server (item 308), the program of instructions running on the computerized devices of the e-mail clients then causes those e-mail clients who have received an e-mail message to provide an indication of e-mail receipt to the e-mail computer server, as shown in item 310. This provides a substantially faster indication to the e-mail computer server system that it has regained functionality when compared to the amount of time it would take the e-mail computer server system to send out and receive back various test messages. In other words, by having the API run on the e-mail clients, the e-mail clients can immediately provide notice to the e-mail computer server systems that the problem has been corrected, and this notification process from the e-mail clients will happen much faster than if the e-mail computer system server attempted to self diagnose whether it was successfully sending and receiving new e-mails after the outage.

Further, by having each individual e-mail client provide their own indication as to whether they are able to send/receive e-mails from the e-mail computer server systems, the e-mail computer server system can learn which corrective actions were effective on different groups of e-mail clients. Therefore, by knowing to which e-mail clients service was restored, and the timing of such restoration, the embodiments herein allow the e-mail computer server system to more easily learn which corrective actions restored the most e-mail clients the most quickly. With such knowledge, the embodiments herein allow the e-mail computer server system to more quickly solve future outages and other related problems.

In item 312, after the e-mail computer server receives the indication of e-mail receipt from the e-mail clients in item 310, the e-mail computer server can then provide an update to the other e-mail clients that e-mail can now be sent. While less than all of the e-mail clients that lost service may provide the indication of e-mail receipt, the e-mail computer server can potentially provide the update that e-mail can be sent to all of the e-mail clients that lost service. Therefore, with embodiments herein, certain members of the community (e-mail clients) will provide notice to the e-mail computer server system that service has been restored, and then the e-mail computer server system can notify the remainder of the e-mail clients (that lost service) of the regained ability to now send and receive e-mail.

Subsequently, when the e-mail clients receive the update indicating that e-mail can be sent, the e-mail clients then deactivate the program of instructions by again changing the flag in item 314. By disabling or deactivating the API program of instructions, this will prevent the e-mail computer server system from being overwhelmed with a large volume of "e-mail up" notifications that would otherwise be issued from the API as each of the individual e-mail clients receives their first post-outage e-mail.

As shown schematically in FIG. 2, another computer-implemented method herein uses at least one of the first computerized devices 354-359 to monitor the ability of an electronic mail (e-mail) computer server (that operates on and through the first computerized devices 354-359) to send and receive e-mail messages to and from second computerized devices 352 operated by e-mail clients of the e-mail computer server over a local area or wide area network (such as private networks or public networks, such as the Internet). The various devices that could perform the monitoring/notification can include (but are not limited to) monitoring servers 354, virtual private network (VPN) servers 355, enterprise servers 357, portal servers 358, and other servers 356, 359, whether currently known or developed in the future.

This method provides, to the second computerized devices 352 of the e-mail clients, updates regarding the ability to send and receive e-mail messages using the first computerized devices 354. When the second computerized devices 352 are notified (or determined on their own) that the e-mail computer server is unable to send the e-mail messages, the second computerized devices 352 activate the API program of instructions. When the program of instructions is active and at least one of the second computerized devices 352 then receives an e-mail message from the e-mail computer server, the program of instructions causes the second computerized devices 352 to provide an indication of e-mail receipt to the e-mail computer server. Then, when the e-mail computer server receives the indication of e-mail receipt from the second computerized devices 352, the first computerized devices 354 provide an update to the second computerized devices 352 that e-mail can be sent. Also, when the second computerized devices 352 receive the update that e-mail can be sent, the second computerized devices 352 deactivate the program of instructions.

As will be appreciated by one skilled in the art, aspects of the embodiments herein may be a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in at least one computer readable medium(s) having computer readable program code embodied thereon.

Any combination of at least one computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments herein may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
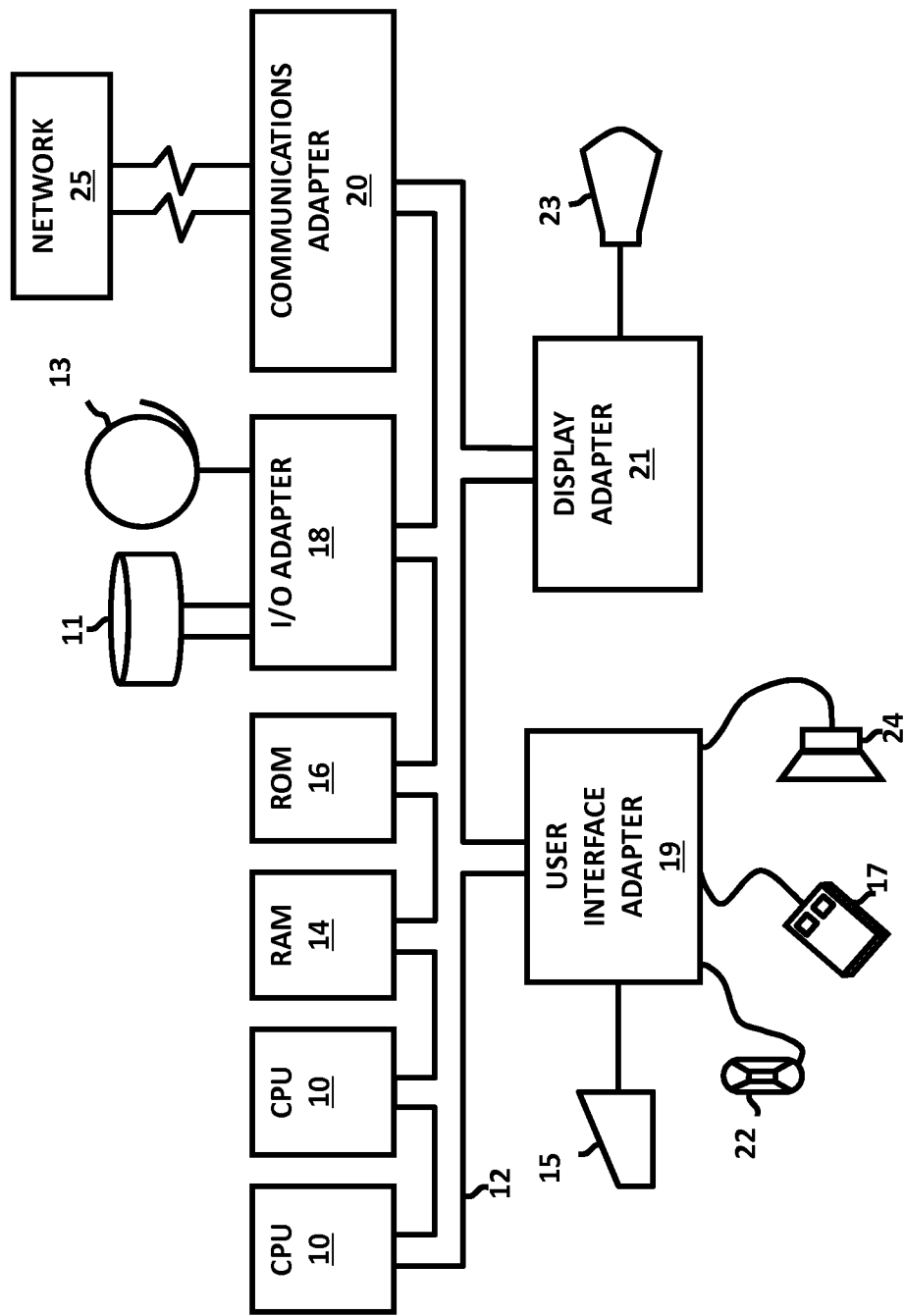
FIG. 3 is a schematic diagram of a hardware system according to embodiments herein.

A representative hardware environment for practicing the embodiments herein is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

An exemplary e-mail computer server embodiment herein comprises at least one processor 10 and at least one communications port 18, 20 operatively connected to the processor 10. The communications port 18, 20 sends and receives e-mail messages to and from e-mail clients of the e-mail computer server. The processor 10 monitors the ability to send and receive the e-mail messages to and from e-mail clients of the e-mail computer server. The communications port 18, 20 provides, to the e-mail clients, updates regarding the ability to send and receive e-mail messages. The communications port 18, 20 also provides, to the e-mail clients, a program of instructions. When the e-mail clients determine that the e-mail computer server is unable to send the e-mail messages, the e-mail clients activate the program of instructions. When the program of instructions is active and then the e-mail clients receive an e-mail message from the e-mail computer server, the program of instructions causes the e-mail clients to provide an indication of e-mail receipt to the e-mail computer server. Then when the e-mail computer server receives the indication of e-mail receipt from the e-mail clients, the e-mail computer server provides an update to the e-mail clients that e-mail can be sent. After the e-mail clients receive the update that e-mail can be sent, the e-mail clients then deactivate the program of instructions.

The flowchart and block diagrams in the figures illustrate the architecture, functionality, and operation of possible implementations of systems, methods and computer program products according to various embodiments herein. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 4:
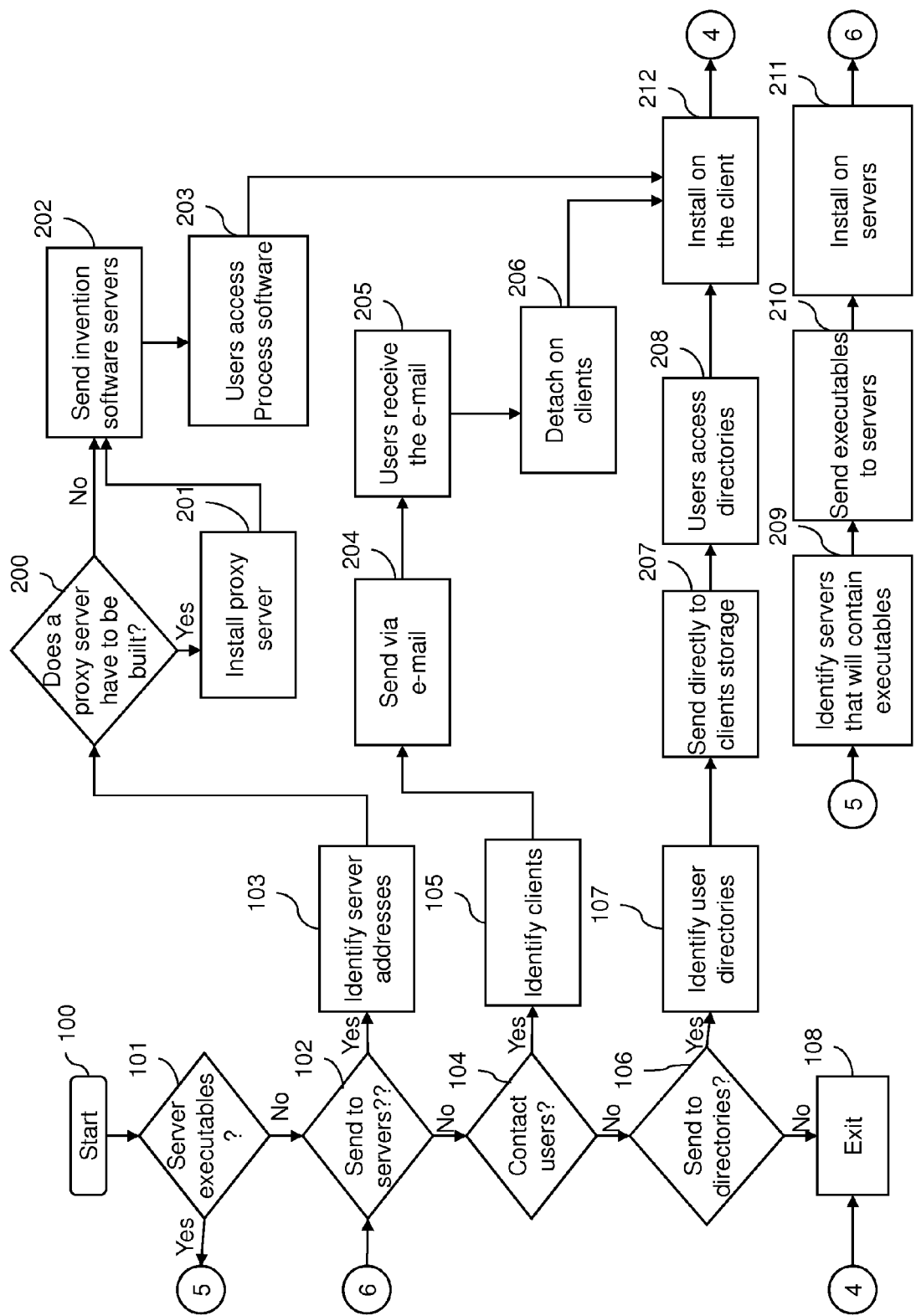
FIG. 4 is a schematic diagram of a deployment system according to embodiments herein.

More specifically, as shown in FIG. 4, in step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104, a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5:
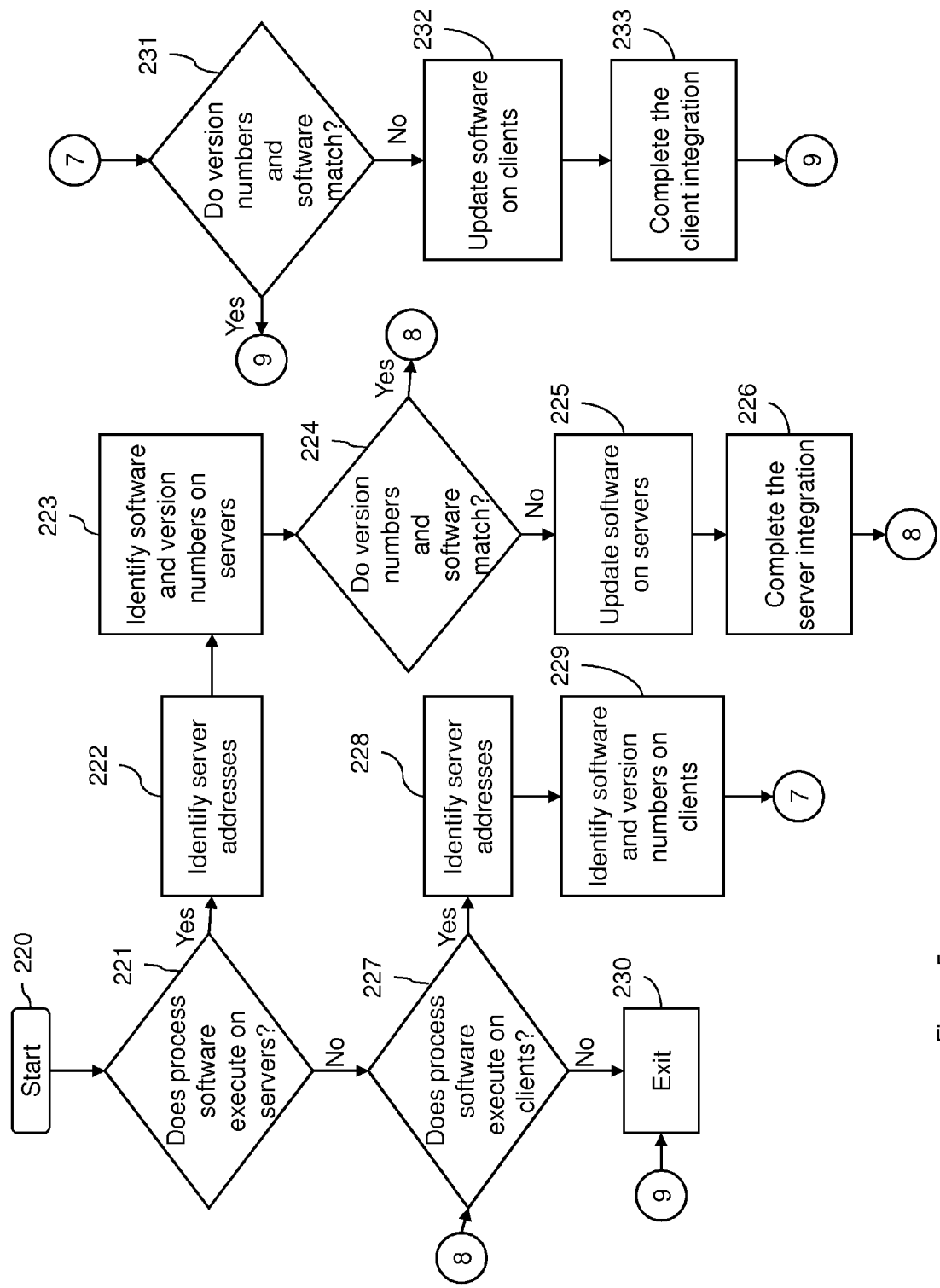
FIG. 5 is a schematic diagram of an integration system according to embodiments herein.

More specifically, as shown in FIG. 5, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If at least one of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If at least one of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a payas-you-go model.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
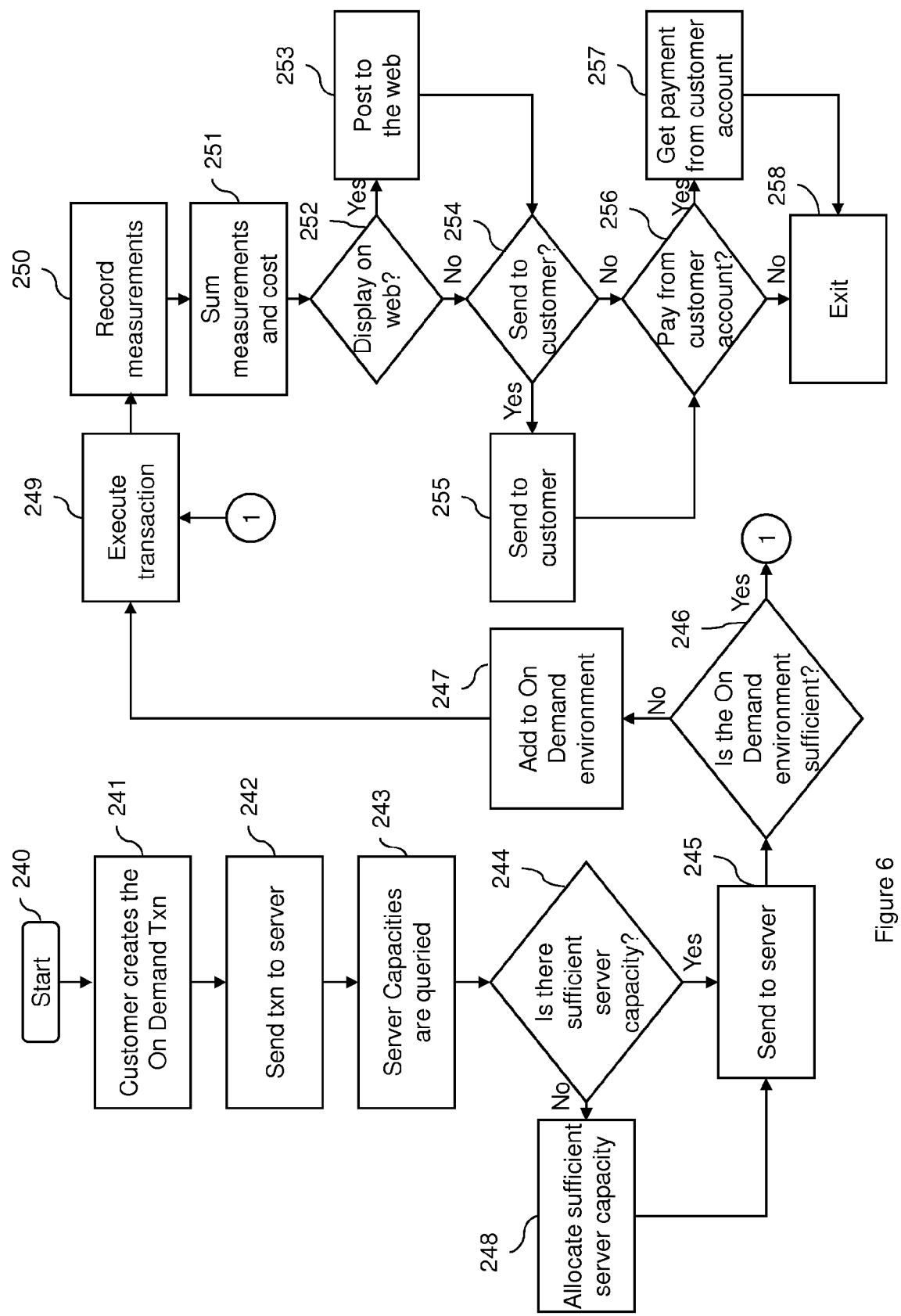
FIG. 6 is a schematic diagram of an on demand system according to embodiments herein.

More specifically, as shown in FIG. 6, in step 240 begins the On Demand process. A transaction is created that contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions is, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

More specifically, as shown in FIG. 7, in step 260 begins the Virtual Private Network (VPN) process. A determination is made to see if a VPN for remote access is required 261. If it is not required, then proceed to 262. If it is required, then determine if the remote access VPN exists 264.

As shown in FIG. 8, if it does exist, then proceed to 265. Otherwise, identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of at least one other feature, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-implemented method comprising:
  determining, by e-mail clients, that an e-mail outage has occurred based on non-receipt of a periodic status notification expected by said e-mail clients from an associated e-mail computer server;
  when said e-mail clients determine that said e-mail outage has occurred, said e-mail clients provide a notice of said e-mail outage on a graphic user interface of said e-mail clients and activate a program of instructions;

when said program of instructions is active and said e-mail clients receive an e-mail message from said e-mail computer server, said program of instructions causes said e-mail clients to provide an indication of e-mail receipt to said e-mail computer server thereby allowing said e-mail computer server to learn which corrective actions restored most e-mail clients most quickly;

when said e-mail computer server receives said indication of e-mail receipt, said e-mail computer server provides said periodic status notification to said e-mail clients; and when said e-mail clients receive said periodic status notification, said e-mail clients provide a notice that said e-mail outage has ended on said graphic user interface and deactivate said program of instructions.

2. The method according to claim 1, less than all of said e-mail clients providing said indication of e-mail receipt.

3. The method according to claim 1, said e-mail computer server providing said periodic status notification to all of said e-mail clients.

4. The method according to claim 1, said e-mail clients comprising mobile and non-mobile devices.

5. A computer-implemented method comprising:

determining, by e-mail clients, that an e-mail outage has occurred based on non-receipt of a periodic status notification expected by said e-mail clients from an associated e-mail computer server;

when said e-mail clients determine that said e-mail outage has occurred, said e-mail clients provide a notice of said e-mail outage on a graphic user interface of said e-mail clients and activate a program of instructions;

when said program of instructions is active and said e-mail clients receive an e-mail message from said e-mail computer server, said program of instructions causes said e-mail clients to provide an indication of e-mail receipt to said e-mail computer server thereby allowing said e-mail computer server to learn which corrective actions restored most e-mail clients most quickly;

when said e-mail computer server receives said indication of e-mail receipt, said e-mail computer server provide said periodic status notification to said e-mail clients;

when said e-mail clients receive said periodic status notification, said e-mail clients provide a notice that said e-mail outage has ended on said graphic user interface and deactivate said program of instructions;

determining, by said e-mail computer server, a timing of e-mail service restoration from said e-mail outage for different corrective actions; and determining, by said e-mail computer server, groups of e-mail clients receiving said service restoration from said e-mail outage by said different corrective actions.

6. The method according to claim 5, less than all of said e-mail clients providing said indication of e-mail receipt.

7. The method according to claim 5, said e-mail computer server providing said periodic status notification to all of said e-mail clients.

8. The method according to claim 5, said e-mail clients- mobile and non-mobile devices.

9. A system comprising:

an e-mail computer server; and e-mail clients operatively connected to said e-mail server, said e-mail clients having a graphic user interface, said e-mail computer server having at least one communications port, said communications port sending and receiving e-mail messages to and from e-mail clients of said e-mail computer server;

said e-mail clients, determining that an e-mail outage has occurred based on non-receipt of a periodic status notification expected by said e-mail clients from an said e-mail computer server;

said communications port providing, to said e-mail clients, a program of instructions, when said e-mail clients determine that said outage has occurred, said e-mail clients provide a notice of said e-mail outage on said graphic user interface and activate said program of instructions;

when said program of instructions is active and said e-mail clients receive an e-mail message from said e-mail computer server, said program of instructions causes said e-mail clients to provide an indication of e-mail receipt to said e-mail computer server thereby allowing said e-mail computer server to learn which corrective actions restored most e-mail clients most quickly;

when said e-mail computer server receives said indication of e-mail receipt, said e-mail computer server provides said periodic status notification to said e-mail clients; and when said e-mail clients receive said periodic status notification, said e-mail clients provide a notice that said e-mail outage has ended on said graphic user interface and deactivate said program of instructions.

10. The system according to claim 9, less than all of said e-mail clients providing said indication of e-mail receipt.

11. The system according to claim 9, said e-mail computer server providing said periodic status notification to all of said e-mail clients.

12. The system according to claim 9, said e-mail clients comprising mobile and non-mobile devices.

13. A computer storage device comprising a non-transitory computer-readable storage medium storing a program of instructions executable by a computer, said program of instructions causing said computer to perform a method comprising:

determining, by e-mail clients, that an e-mail outage has occurred based on non-receipt of a periodic status notification expected by said e-mail clients from an associated e-mail computer server;

when said e-mail clients determine that said e-mail outage has occurred, said e-mail clients provide a notice of said e-mail outage on a graphic user interface of said e-mail clients and activate a program of instructions;

when said program of instructions is active and said e-mail clients receive an e-mail message from said e-mail computer server, said program of instructions causes said e-mail clients to provide an indication of e-mail receipt to said e-mail computer server thereby allowing said e-mail computer server to learn which corrective actions restored most e-mail clients most quickly;

when said e-mail computer server receives said indication of e-mail receipt, said e-mail computer server provides said periodic status notification to said e-mail clients; and when said e-mail clients receive said periodic status notification, said e-mail clients provide a notice that said e-mail outage has ended on said graphic user interface and deactivate said program of instructions.

14. The computer storage device according to claim 13, less than all of said e-mail clients providing said indication of e-mail receipt.

15. The computer storage device according to claim 13, said e-mail computer server providing said periodic status notification to all of said e-mail clients.

16. The computer storage device according to claim 13, said e-mail clients comprising mobile and non-mobile devices.

\* \* \* \* \*